US007231589B2

(12) United States Patent
Yamagata et al.

(10) Patent No.: US 7,231,589 B2
(45) Date of Patent: Jun. 12, 2007

(54) ACCESS USAGE DATA STORING AND TRANSMITTING PROGRAM AND STORAGE MEDIUM

(75) Inventors: Junichi Yamagata, Kanagawa-Ken (JP); Takayuki Kunieda, Kanagawa-Ken (JP); Yuki Wakita, Kanagawa-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 395 days.

(21) Appl. No.: 10/446,697

(22) Filed: May 29, 2003

(65) Prior Publication Data

US 2004/0030729 A1    Feb. 12, 2004

(30) Foreign Application Priority Data

May 29, 2002    (JP) .............................. 2002-155127

(51) Int. Cl.
G06F 17/00    (2006.01)

(52) U.S. Cl. ...................... 715/500; 715/741; 715/745; 726/2; 726/7; 713/182

(58) Field of Classification Search ................ 715/500, 715/751, 741, 745; 717/178; 709/223, 225; 705/51, 53, 14; 713/181, 193, 18, 19, 32; 726/27, 2, 7, 22, 23, 24; 707/104, 104.1
See application file for complete search history.

(56) References Cited

U.S. PATENT DOCUMENTS

| | | | | | |
|---|---|---|---|---|---|
| 4,791,565 | A | * | 12/1988 | Dunham et al. ............... 726/31 |
| 4,900,904 | A | * | 2/1990 | Wright et al. ................ 235/381 |
| 5,010,571 | A | * | 4/1991 | Katznelson ................... 705/53 |
| 5,050,213 | A | * | 9/1991 | Shear .......................... 705/53 |
| 5,293,422 | A | * | 3/1994 | Loiacono .................... 713/200 |
| 5,412,718 | A | * | 5/1995 | Narasimhalu et al. ........ 705/51 |
| 5,457,746 | A | * | 10/1995 | Dolphin ........................ 705/51 |
| 5,532,735 | A | * | 7/1996 | Blahut et al. ................. 725/32 |
| 5,563,946 | A | * | 10/1996 | Cooper et al. ................ 705/56 |
| 5,629,980 | A | * | 5/1997 | Stefik et al. .................. 705/54 |
| 5,634,012 | A | * | 5/1997 | Stefik et al. .................. 705/39 |
| 5,638,443 | A | * | 6/1997 | Stefik et al. .................. 705/54 |
| 5,677,953 | A | * | 10/1997 | Dolphin ........................ 705/51 |
| RE35,839 | E | * | 7/1998 | Asai et al. ..................... 713/2 |
| 5,809,145 | A | * | 9/1998 | Slik et al. ..................... 705/52 |
| 5,838,314 | A | * | 11/1998 | Neel et al. ..................... 725/8 |
| 5,845,069 | A | * | 12/1998 | Tanaka ........................ 726/20 |

(Continued)

OTHER PUBLICATIONS

I. Flink et al., "Stuffit Deluxe User's Guide", Oct. 1999, Aladdin Systems, Inc. 135 pages.*

*Primary Examiner*—Heather R. Herndon
*Assistant Examiner*—James H Blackwell
(74) *Attorney, Agent, or Firm*—Dickstein Shapiro LLP

(57) ABSTRACT

An external storage medium storing a computer readable access control program and a plurality of files. The access control program performs a first accessing process permitting a computer to access only the access control program when the computer attempts to access any of the files. A file view process is performed so as to display a view of the files when the computer accesses the information via the access control program. A second accessing process is performed when the computer accesses the information via the access control program while a user designates a prescribed file from the file view. The access control program stores information related to accessing executed by the second accessing process in the storage medium as access usage information.

34 Claims, 5 Drawing Sheets

U.S. PATENT DOCUMENTS

| | | | | |
|---|---|---|---|---|
| 5,903,646 | A * | 5/1999 | Rackman | 705/51 |
| 5,903,647 | A * | 5/1999 | Ronning | 705/57 |
| 5,937,158 | A * | 8/1999 | Uranaka | 726/4 |
| 5,970,143 | A * | 10/1999 | Schneier et al. | 713/181 |
| 6,012,146 | A * | 1/2000 | Liebenow | 726/17 |
| 6,014,696 | A * | 1/2000 | Araki et al. | 709/219 |
| 6,026,368 | A * | 2/2000 | Brown et al. | 705/14 |
| 6,122,631 | A * | 9/2000 | Berbec et al. | 707/9 |
| 6,158,004 | A * | 12/2000 | Mason et al. | 713/150 |
| 6,170,060 | B1 * | 1/2001 | Mott et al. | 726/29 |
| 6,195,693 | B1 * | 2/2001 | Berry et al. | 709/219 |
| 6,216,112 | B1 * | 4/2001 | Fuller et al. | 705/14 |
| 6,272,636 | B1 * | 8/2001 | Neville et al. | 713/189 |
| 6,279,036 | B1 * | 8/2001 | Himmel et al. | 709/224 |
| 6,282,653 | B1 * | 8/2001 | Berstis et al. | 726/26 |
| 6,314,409 | B2 * | 11/2001 | Schneck et al. | 705/54 |
| 6,400,996 | B1 * | 6/2002 | Hoffberg et al. | 700/83 |
| 6,453,420 | B1 * | 9/2002 | Collart | 726/26 |
| 6,507,851 | B1 * | 1/2003 | Fujiwara et al. | 707/104.1 |
| 6,578,199 | B1 * | 6/2003 | Tsou et al. | 717/178 |
| 6,587,949 | B1 * | 7/2003 | Steinberg | 713/193 |
| 6,601,087 | B1 * | 7/2003 | Zhu et al. | 709/205 |
| 6,622,097 | B2 * | 9/2003 | Hunter | 702/61 |
| 6,654,032 | B1 * | 11/2003 | Zhu et al. | 715/753 |
| 6,763,501 | B1 * | 7/2004 | Zhu et al. | 715/530 |
| 6,850,975 | B1 * | 2/2005 | Danneels et al. | 709/224 |
| 6,885,388 | B2 * | 4/2005 | Gunter et al. | 715/751 |
| 6,901,448 | B2 * | 5/2005 | Zhu et al. | 709/228 |
| 6,904,455 | B1 * | 6/2005 | Yen | 709/217 |
| 6,920,567 | B1 * | 7/2005 | Doherty et al. | 726/22 |
| 6,950,941 | B1 * | 9/2005 | Lee et al. | 713/193 |
| 6,966,000 | B2 * | 11/2005 | Zhang et al. | 726/22 |
| 7,028,340 | B1 * | 4/2006 | Kamada et al. | 726/29 |
| 7,036,145 | B1 * | 4/2006 | Murphy et al. | 726/21 |
| 7,043,698 | B2 * | 5/2006 | Newbold | 715/789 |
| 7,047,302 | B1 * | 5/2006 | Chatani et al. | 709/229 |
| 2001/0056405 | A1 * | 12/2001 | Muyres et al. | 705/52 |
| 2002/0010679 | A1 * | 1/2002 | Felsher | 705/51 |
| 2002/0016922 | A1 * | 2/2002 | Richards et al. | 713/200 |
| 2002/0022989 | A1 * | 2/2002 | Endo et al. | 705/14 |
| 2002/0104019 | A1 * | 8/2002 | Chatani et al. | 713/201 |
| 2002/0194337 | A1 * | 12/2002 | Knight et al. | 709/225 |
| 2003/0055953 | A1 * | 3/2003 | Motoyama et al. | 709/224 |
| 2003/0088439 | A1 * | 5/2003 | Grushka | 705/2 |
| 2003/0101092 | A1 * | 5/2003 | Fuller et al. | 705/14 |
| 2003/0196114 | A1 * | 10/2003 | Brew et al. | 713/201 |
| 2004/0024889 | A1 * | 2/2004 | Getsin et al. | 709/229 |
| 2004/0260801 | A1 * | 12/2004 | Li | 709/223 |

* cited by examiner

ACCESS USAGE DATA STORING AND TRANSMITTING PROGRAM AND STORAGE MEDIUM

CROSS-REFERENCE TO RELATED APPLICATIONS

This application claims priority under 35 USC §119 to Japanese patent application No. JAPA2002-155127 filed May 29, 2002, the entire contents of which is incorporated herein by reference.

FIELD OF THE INVENTION

This invention relates to a storage medium and program, in particular, to a storage medium and program capable of storing access data related to a user's access of a file.

BACKGROUND OF THE INVENTION

In the past, access to an information rewritable external storage medium such as a DVD+RW has not been recorded and controlled. However, since the preferences of a user are generally reflected in the type and frequency of access to the external storage medium that stores data, this information can be useful for a supplier of the external storage medium, if collected with the consent of the user.

BRIEF SUMMARY OF THE INVENTION

Accordingly, the present invention provides a new storage medium. The novel storage medium stores a computer readable access control program, files, and various information relating to the files. The access control program performs a first access process permitting the computer access only to the access control program when the computer attempts to access the files or the information in the files, performing a file viewing process displaying a view/list of the files when the computer accesses the information via the access control program, and performing a second access process allowing the computer to access the information in the files when the computer accesses the information via the access control program and the user designates a prescribed file from the file view.

In another embodiment, the access control program enables the computer to perform an access information storing process storing information related to accessing performed by the second access process in the storage medium as access usage information.

In yet another embodiment, the access information storing process stores at least a name of a file accessed by the access process and a number of times the file is accessed.

In yet another embodiment, the program performs the act of transmitting the access information to a prescribed location on a network.

A more complete appreciation of the present invention and many of the attendant advantages thereof will be readily obtained as the same becomes better understood by the following detailed description when considered in connection with the accompanying drawings, wherein:

DETAILED DESCRIPTION OF THE INVENTION

Figure 1:
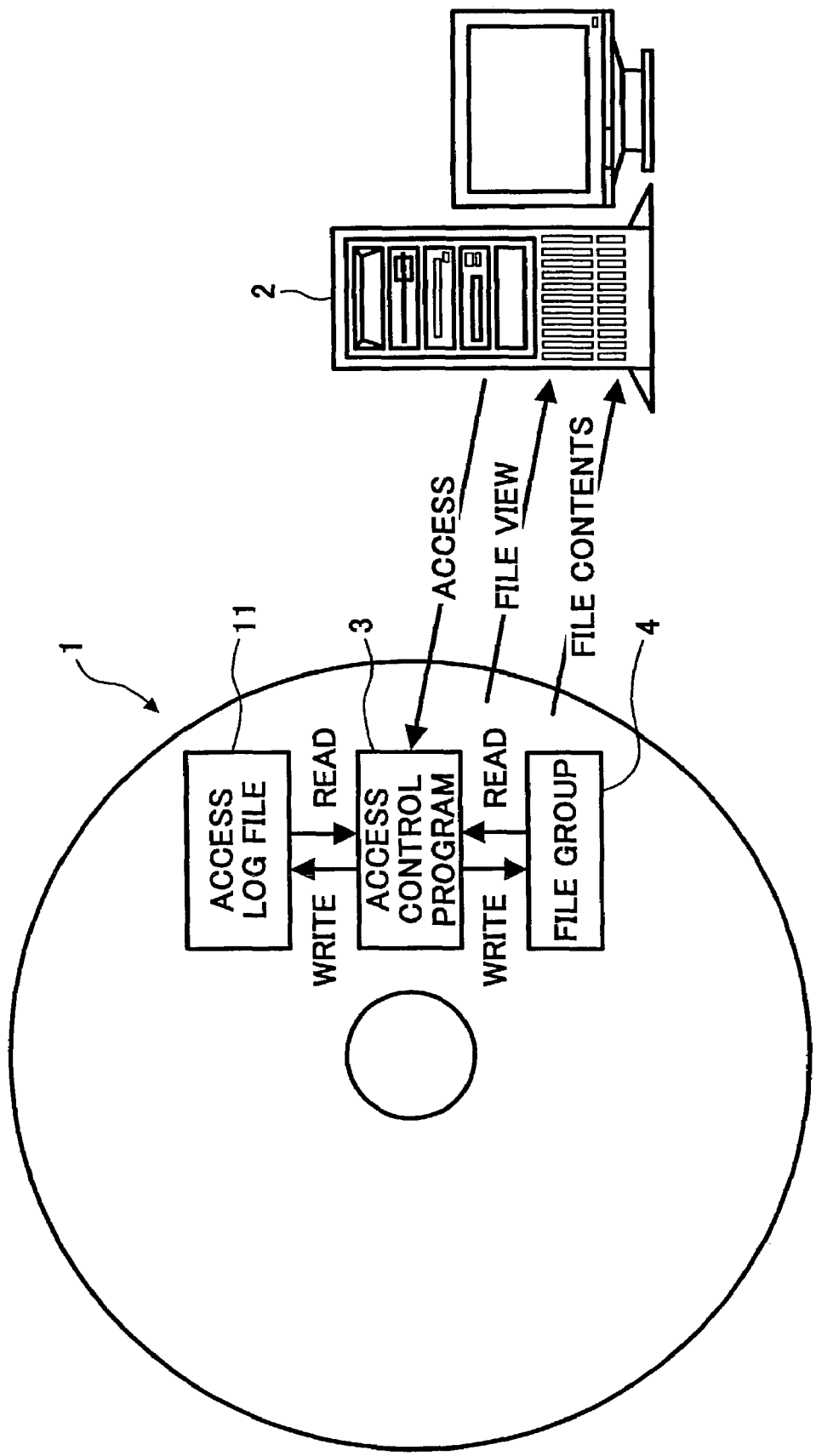
FIG. 1 is a conceptual chart illustrating an exemplary embodiment of a storage medium according to the present invention.

Referring now to the drawings, wherein like reference numerals designate identical or corresponding parts throughout several views, in particular in FIG. 1, one example of a storage medium 1 is schematically illustrated. A rewritable external storage medium such as a DVD+RW is utilized as a storage medium 1. Access controlling program 3 controlling a personal computer's (PC) 2 access to the storage medium 1, and a plurality of files 4 (formed from files A, B, C, etc.) storing various information are stored on the storage medium 1.

Figure 2:
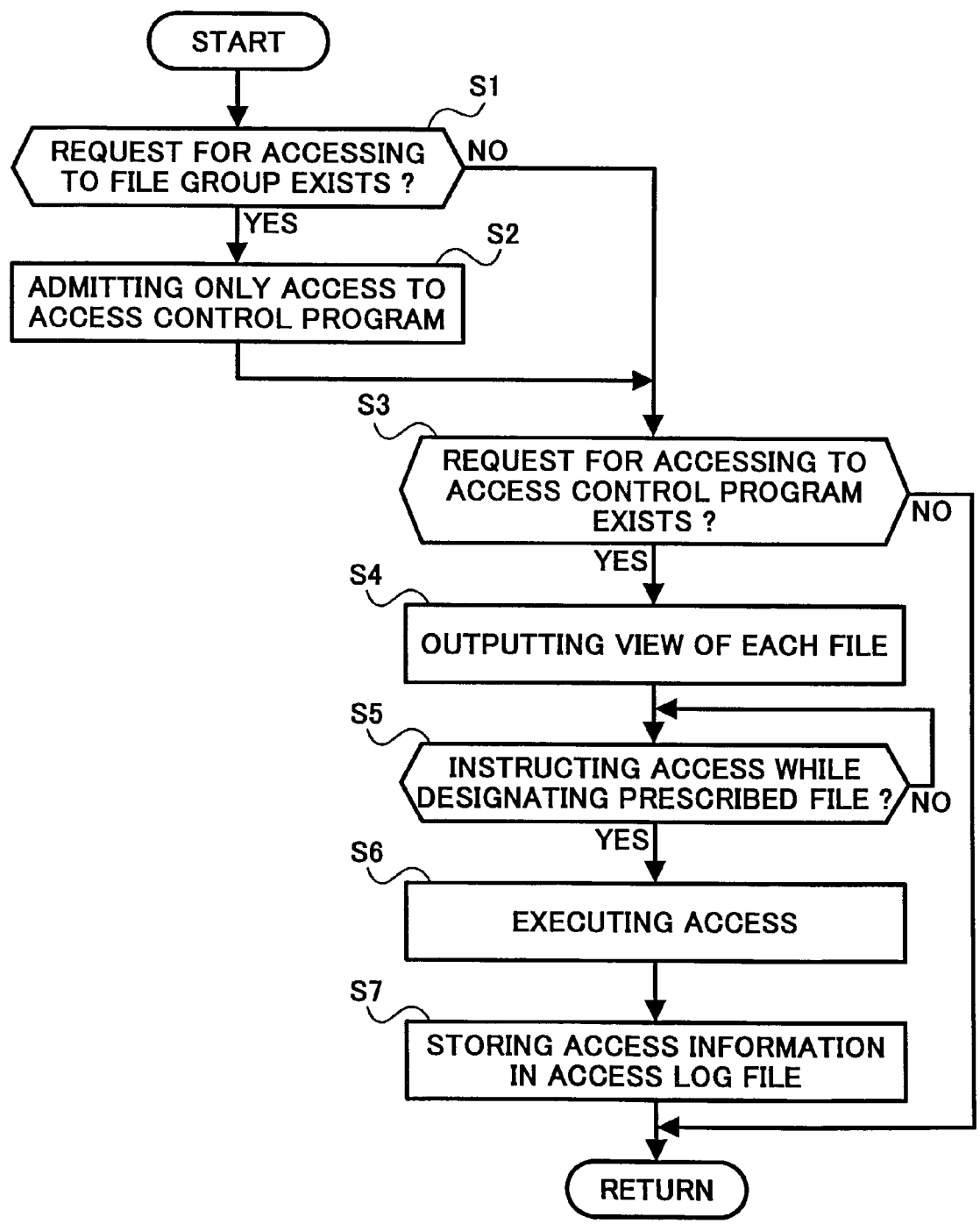
FIG. 2 is a flowchart illustrating exemplary processing performed by access control program stored in the storage medium.

FIG. 2 illustrates an exemplary embodiment of a processing operation executed by the access control program 3 when running in the PC 2. As shown, when access of the PC 2 to the files 4 for reading or writing is instructed (Yes, in step S1), the access to the files 4 is inhibited. Specifically, only access to the access control program 3 is permitted (in step S2). A first accessing process is then executed such that only an icon of the access control program 3 is displayed on the display of the PC 2 in a view of files stored in the storage medium 1. However, the files A, B, C, etc included in the files 4 are not displayed in this stage.

When the user clicks the icon of the access control program 3 on the display, for example, and thereby accessing to the access control program 3 (Yes in step S3), the view of the files A, B, C, etc restricted by the access control program 3 is output (in step S4). Then, a file view process is performed such that respective icons of files A, B, C, etc are displayed on the display of the PC 2 as a view of files registered in the storage medium 1.

Then, when a desired file is designated among these files A, B, C, etc, and access thereto for reading or writing is instructed by a user via the PC 2 (Yes in step S5), the access is performed (in step S6) so as to start a second accessing process.

Figure 3:
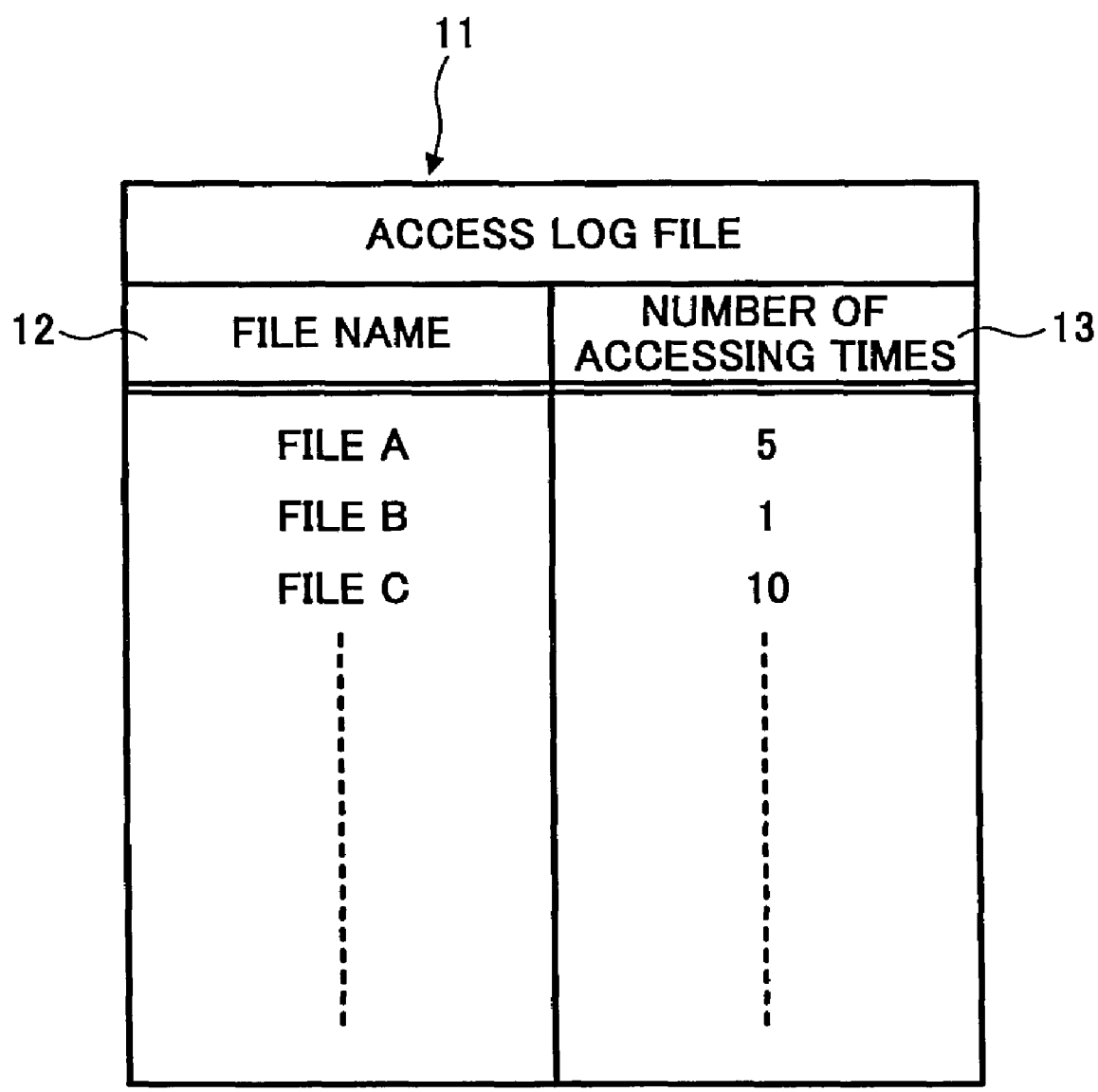
FIG. 3 is a chart illustrating an exemplary log file stored in the storage medium.

Access information representing access to the storage medium 1 is stored as access usage information in an access log file 11 provided in the storage medium 1 as illustrated in FIG. 3 (in step S7). Specifically, at least a name 12 of a file accessed during step S6 and a number of times 13 the file is accessed are stored as access information.

Figure 4:
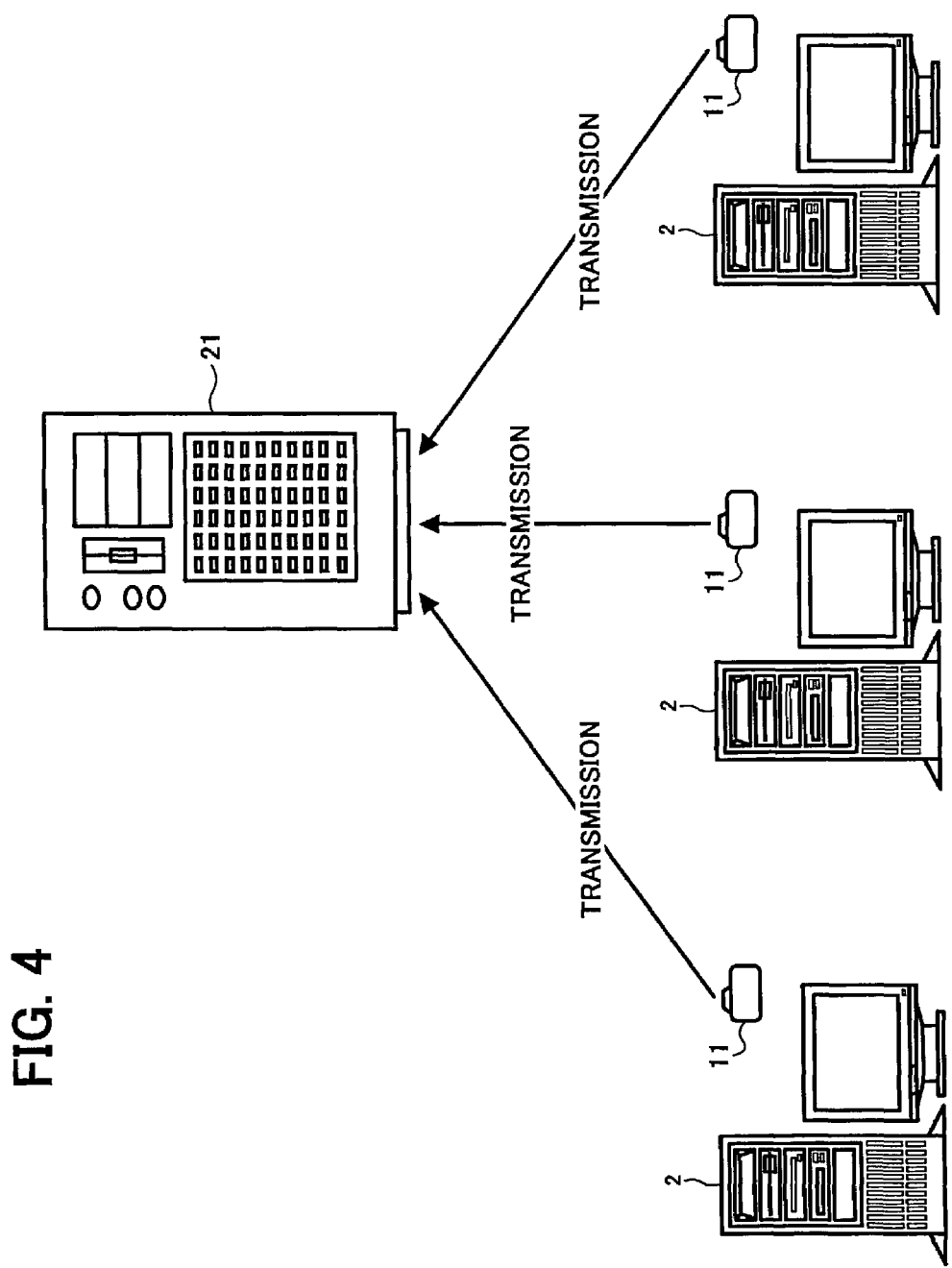
FIG. 4 is a block diagram illustrating alternative exemplary processing performed by access control program stored in the storage medium.
Figure 5:
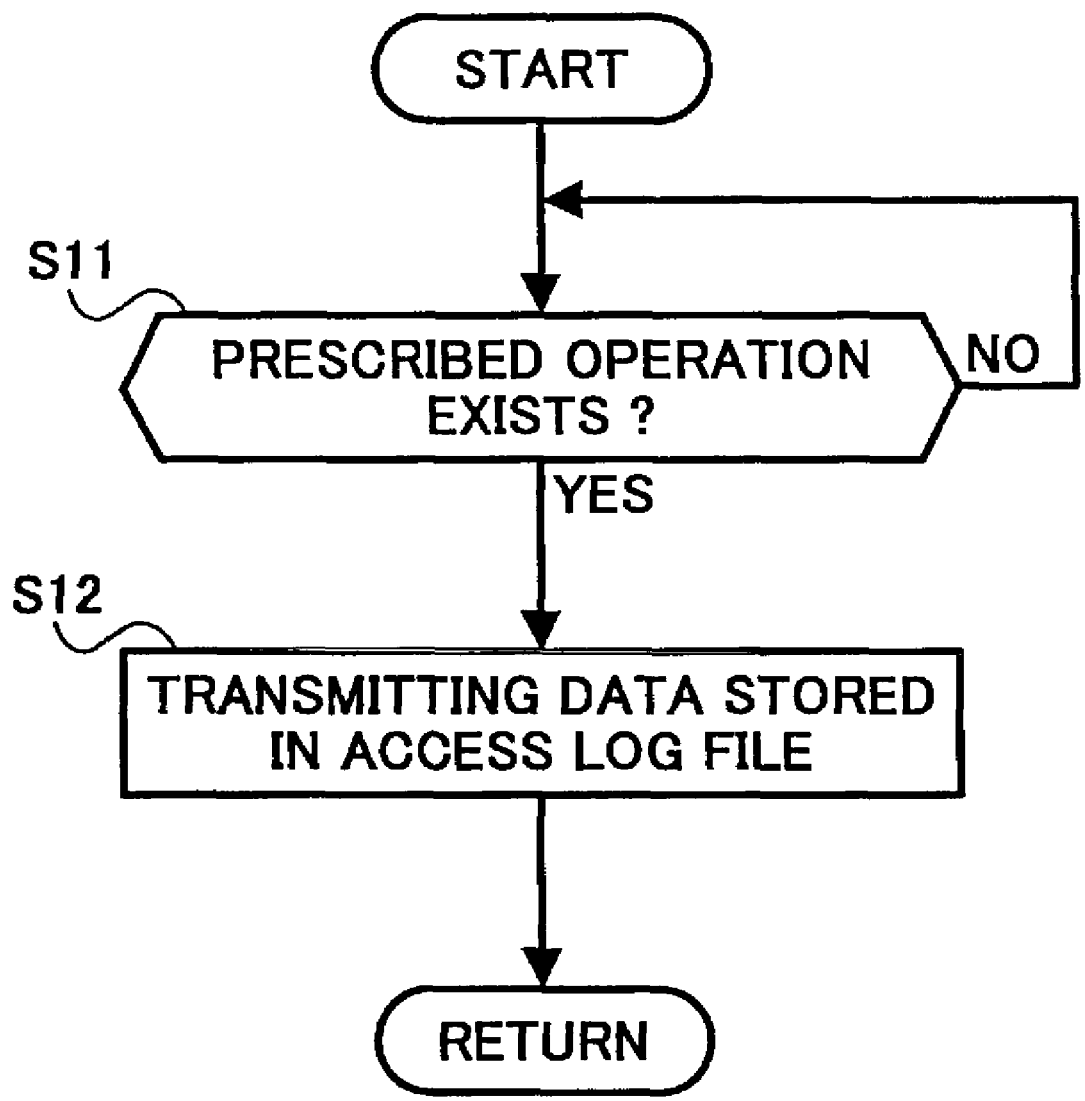
FIG. 5 is a flowchart illustrating the alternative exemplary processing.

An exemplary processing operation executed by the PC 2 in accordance with the access control program 3 is now described with reference to FIGS. 4 and 5. When a user performs any one of accessing operations through the PC 2 in accordance with the access control program 3 (in step S11), the PC 2 transmits, using its communication function, data stored in the access log file 11 stored in the storage medium 1 to a Web server 21 located at a prescribed position through the Internet (in step S12).

Specifically, when a button generating an instruction indicating transmission of the data of the access log file 11 is clicked, the access control program 3 may use the communication function of the PC 2 and automatically transmit the data of the access log file 11 to the Web server 21. Otherwise, a user can access a site operated by the Web server 21 and transmit the data in the access log file 11. Further, under the condition that the access control program 3 displays messages indicating consent of a user on a display of the PC 2 and obtains the consent through his or her corresponding operation through the PC 2, the access control program 3 may determine current year, month, and date using its clock function. The access control program 3 may then automatically transmit the data of the access log file 11 to the Web server 21 when a prescribed cutoff point has elapsed.

The Web server 21 may be operated by the provider of the storage medium 1, and is enabled to receive the data of the access log file 11 from each user, thereby easily collecting survey or usage data about a frequency of access of a user to each of the files A, B, C, etc.

Further, the supplier of the storage medium 1 can give a prescribed award as a premium/award to every user or "lottery winners" (randomly selected users) who have transmitted the data of the access log file 11. For example, the Internet provider can operate the Web server 21 and partially release a user, who has transmitted the data of the access log file 11, from connection charges for the Internet.

Messages indicating that premiums are given to the users or "lottery winners" who transmitted the data of the access log file 11 may be displayed to inform users in accordance with the access control program 3.

The mechanisms and processes set forth in the present invention may be implemented using one or more conventional general-purpose microprocessors and/or signal processors programmed according to the teachings in the present specification as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

While the invention has been described and illustrated with reference to specific exemplary embodiments, it should be understood that many modifications and substitutions can be made without departing from the spirit and scope of the invention. Accordingly, the invention is not to be considered as limited by the foregoing description but is only limited by the scope of the appended claims.

What is claimed as new and desired to be protected by Letters Patent of the United States is:

1. A storage medium storing a computer readable access control program and a plurality of files, said access control program containing instructions for causing a computer to perform the acts of:
   permitting, during a first accessing process, a computer access only to the access control program when a computer attempts to access the plurality of files stored in said storage medium;
   displaying a view of the plurality of files stored in said storage medium, when the access control program is executed; and
   allowing the computer access to the plurality of files during a second accessing process, when the computer accesses the plurality of files via the access control program, in response to selection of a prescribed file from said view of the plurality of files.

2. The storage medium according to claim 1, wherein said access control program contains instructions for causing said computer to store information related to accessing executed by the second accessing process in the storage medium as access usage information.

3. The storage medium according to claim 2, wherein said information includes at least a name of a file accessed and a number of times the file is accessed by the second accessing process.

4. The storage medium according to claim 2, wherein said access control program contains instructions for causing said computer to perform the act of transmitting the access information stored in the storage medium to a prescribed location in a network.

5. The storage medium according to claim 4, wherein said prescribed location is a Web server.

6. The storage medium according to claim 5, wherein said Web server is operated by a supplier of the storage medium.

7. The storage medium according to claim 4, wherein said transmitting process is performed with consent of a user.

8. The storage medium according to claim 4, wherein said transmitting process is automatically performed periodically.

9. The storage medium according to claim 4, wherein said transmitting process is performed in response to an input device entry.

10. The storage medium according to claim 9, wherein said access control program contains instructions for causing said computer to display information related to an award on a display, said award being offered to encourage consent to transmission of said access usage information to a Web server.

11. The storage medium according to claim 4, wherein consent is obtained by receiving messages indicating a request for consent, displayed on a display in accordance with the access control program, is acknowledged.

12. A computer readable access control program stored in a storage medium together with a plurality of files, said access control program containing instructions for causing a computer to perform the acts of:
   permitting a computer to access only the access control program when the computer attempts to access information contained in the plurality of files;
   displaying a view of the plurality of files when the access control program is executed; and
   allowing the computer to access the information contained in the plurality of files as a second accessing process when the computer accesses the information, via the access control program, in response to selection of a prescribed file from said view of the plurality of files.

13. The computer readable access control program according to claim 12, wherein said access control program contains instructions for causing said computer to store information related to accessing executed by the second accessing process in the storage medium as access usage information.

14. The computer readable access control program according to claim 13, wherein said information includes at least a name of a file accessed and a number of times the file is accessed by the second accessing process.

15. The computer readable computer readable access control program according to claim 13, wherein said access control program contains instructions for causing said computer to perform the act of transmitting the access information stored in the storage medium to a prescribed location in a network.

16. The computer readable access control program according to claim 15, wherein said prescribed location is a Web server.

17. The computer readable access control program according to claim 15, wherein said transmitting process is performed with consent of a user.

18. The computer readable access control program according to claim 15, wherein said transmitting process is automatically performed, periodically.

19. The computer readable access control program according to claim 15, wherein said transmitting process is performed in response to an input device entry.

20. The computer readable access control program according to claim 19, wherein said access control program contains instructions for causing said computer to display information related to an award on a display, said award being offered to encourage consent to transmission of said access usage information to a Web server.

21. The computer readable access control program according to claim 16, wherein said Web server is operated by a supplier of the storage medium.

22. The computer readable access control program according to claim 15, wherein said consent is obtained by receiving messages indicating request for consent displayed on the display in accordance with the access control program is acknowledged.

23. A method for controlling and recording access to files comprising:
  executing a computer readable access control program, wherein said computer readable access control program during execution causes a computer to perform the acts of:
  permitting access only to said access control program when attempt is made to access said files;
  displaying a view of said files when the access control program is executed; and
  allowing access to said files in response to a selection of one of said files from said view of said files.

24. The method according to claim 23, wherein said computer readable access control program during execution further causes said computer to perform the act of storing usage information related to accessing said selected file.

25. The method according to claim 24, wherein said usage information includes at least a name of said files accessed and a number of times said file was accessed.

26. The method according to claim 24, wherein said computer readable access control program during execution further causes said computer to perform the act of transmitting said stored usage information to a prescribed location in a network.

27. The method according to claim 26, wherein said location in a network is a Web server.

28. The method according to claim 27, wherein said access control program during execution causes said computer to display information related to an award, said award being offered to encourage consent to transmission of said access usage information to a Web server.

29. The method according to claim 27, wherein said Web server is operated by a supplier of a storage medium on which said files are stored.

30. The method according to claim 26, wherein said transmitting is performed periodically.

31. The method according to claim 23, wherein said files are stored on a storage medium.

32. A method of transmitting access usage information comprising:
  recording access usage information by an access control program on a storage medium;
  encouraging consent to said transmitting of said access usage information by offering premiums; and
  forwarding said access usage information to a Web server via the Internet.

33. A system for controlling and recording access to files comprising:
  a processor;
  a storage medium for storing data files and an access log file; and
  an access control program, wherein said access control program causes said processor to perform the following acts when invoked:
  permitting access only to said access control program when attempt is made to access said files;
  displaying a view of said files when the access control program is executed; and
  allowing access to said files in response to a selection of one of said files from said view of said files.

34. The system according to claim 33, wherein said access control program is stored on said storage medium in computer readable form.

* * * * *